US008150933B2

(12) United States Patent
Martin et al.

(10) Patent No.: US 8,150,933 B2
(45) Date of Patent: Apr. 3, 2012

(54) APPARATUS AND METHOD FOR DELIVERING MESSAGES OVER MULTIPLE MEDIUMS

(75) Inventors: Daryl Martin, Paradise (CA); Ahmed Hassan, Waterloo (CA); J. F. Sean Wilson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1311 days.

(21) Appl. No.: 11/530,093

(22) Filed: Sep. 8, 2006

(65) Prior Publication Data

US 2008/0062881 A1    Mar. 13, 2008

(51) Int. Cl.
*G06F 15/16*    (2006.01)
(52) U.S. Cl. .................................. 709/207; 370/431
(58) Field of Classification Search .................. 370/338, 370/335, 336, 389
See application file for complete search history.

(56) References Cited

U.S. PATENT DOCUMENTS

| | | | | |
|---|---|---|---|---|
| 7,085,812 | B1 * | 8/2006 | Sherwood | 709/206 |
| 8,001,199 | B2 * | 8/2011 | Appelman et al. | 709/206 |
| 2002/0046292 | A1 * | 4/2002 | Tennison et al. | 709/238 |
| 2002/0138586 | A1 | 9/2002 | Paleiov | |
| 2005/0193068 | A1 | 9/2005 | Brown | |
| 2005/0193069 | A1 | 9/2005 | Brown | |
| 2005/0193070 | A1 | 9/2005 | Brown | |
| 2005/0251555 | A1 * | 11/2005 | Little | 709/206 |
| 2006/0083166 | A9 * | 4/2006 | Janczak | 370/230 |
| 2007/0061403 | A1 * | 3/2007 | Seaburg | 709/206 |
| 2007/0211674 | A1 * | 9/2007 | Ragnar Karlberg et al. | 370/338 |
| 2007/0233790 | A1 * | 10/2007 | Agarwal et al. | 709/206 |

FOREIGN PATENT DOCUMENTS

| | | |
|---|---|---|
| WO | WO 01/63946 A | 8/2001 |
| WO | WO 2006/004784 A | 1/2006 |

* cited by examiner

*Primary Examiner* — Kevin C Harper
*Assistant Examiner* — Henry Baron
(74) *Attorney, Agent, or Firm* — Ridout & Maybee LLP

(57) ABSTRACT

A method for transmitting data to a communication device that is configured to receive data through a plurality of alternative communications mediums. The method comprises: determining a priority associated with a data message that is to be provided to the communications device; selecting a desired communications medium for providing the data message to the communications device, wherein if the priority is a first priority, the desired communications medium is selected from a first set that includes at least one of the plurality of communications mediums, and if the priority is a second priority, the desired communications medium is selected from a second set that includes at least one of the plurality of communications mediums, the first set including at least one communications medium from the plurality of communications mediums that is not included in the second set; and providing the data message to the communications device over the desired communications medium if the desired communications medium is available.

27 Claims, 5 Drawing Sheets

APPARATUS AND METHOD FOR DELIVERING MESSAGES OVER MULTIPLE MEDIUMS

FIELD OF TECHNOLOGY

The present application relates generally to communication systems and, more particularly, to a communication mechanism and methods for message delivery to mobile or handheld devices over multiple mediums.

BACKGROUND

Communication networks and systems for mobile devices, such as mobile computers and mobile handheld communication devices, are currently experiencing challenges related to bandwidth bottlenecks because of the relatively narrow bandwidth available in conventional cellular modem data transmissions, for example, as compared to broadband Internet connections. Additionally, the availability of public wireless networking access points has proliferated. While desktop and laptop computers often have easy access to broadband networking and the Internet, mobile handheld devices remain constricted by the expensive, narrow bandwidth available in the cellular network. The high monthly cost of cellular communication remains a deterrent that dissuades many potential users from adopting new wireless handheld technologies. Even with the application of state-of-the-art data compression and data optimization techniques, a high data overhead remains a challenge for meaningful data transmission to portable handheld devices.

In another aspect, conventional handheld communication devices offer little or no control of data delivery among various mediums, e.g. of whether a particular piece of data should be sent using a cellular connection or a wireless local area (WLAN) network connection when available.

BRIEF DESCRIPTION OF THE DRAWINGS

Reference will now be made to the accompanying drawings, which show, by way of example, embodiments and in which.

Like reference numerals are used in the drawings to denote like elements and features.

DETAILED DESCRIPTION

According to one example embodiment there is provided a method for transmitting data to a communication device that is configured to receive data through a plurality of alternative communications mediums. The method comprises: determining a priority associated with a data message that is to be provided to the communications device; selecting a desired communications medium for providing the data message to the communications device, wherein if the priority is a first priority, the desired communications medium is selected from a first set that includes at least one of the plurality of communications mediums, and if the priority is a second priority, the desired communications medium is selected from a second set that includes at least one of the plurality of communications mediums, the first set including at least one communications medium from the plurality of communications mediums that is not included in the second set; and providing the data message to the communications device over the desired communications medium if the desired communications medium is available.

According to another example embodiment is a first communication device for transmitting data to a second communication device that is configured to receive data from the first communication device through a plurality of alternative communications mediums. The first communications device comprises a data delivery module for: determining a priority associated with a data message that is to be provided to the second communications device; selecting a desired communications medium for providing the data message to the second communications device, wherein if the priority is a first priority the desired communications medium is selected from a first set that includes at least one of the plurality of communications mediums, and if the priority is a second priority the desired communications medium is selected from a second set that includes at least one of the plurality of communications mediums, the first set including at least one communications medium from the plurality of communications mediums that is not included in the second set; and providing the data message to the second communications device over the desired communications medium if the desired communications medium is available.

Figure 1:
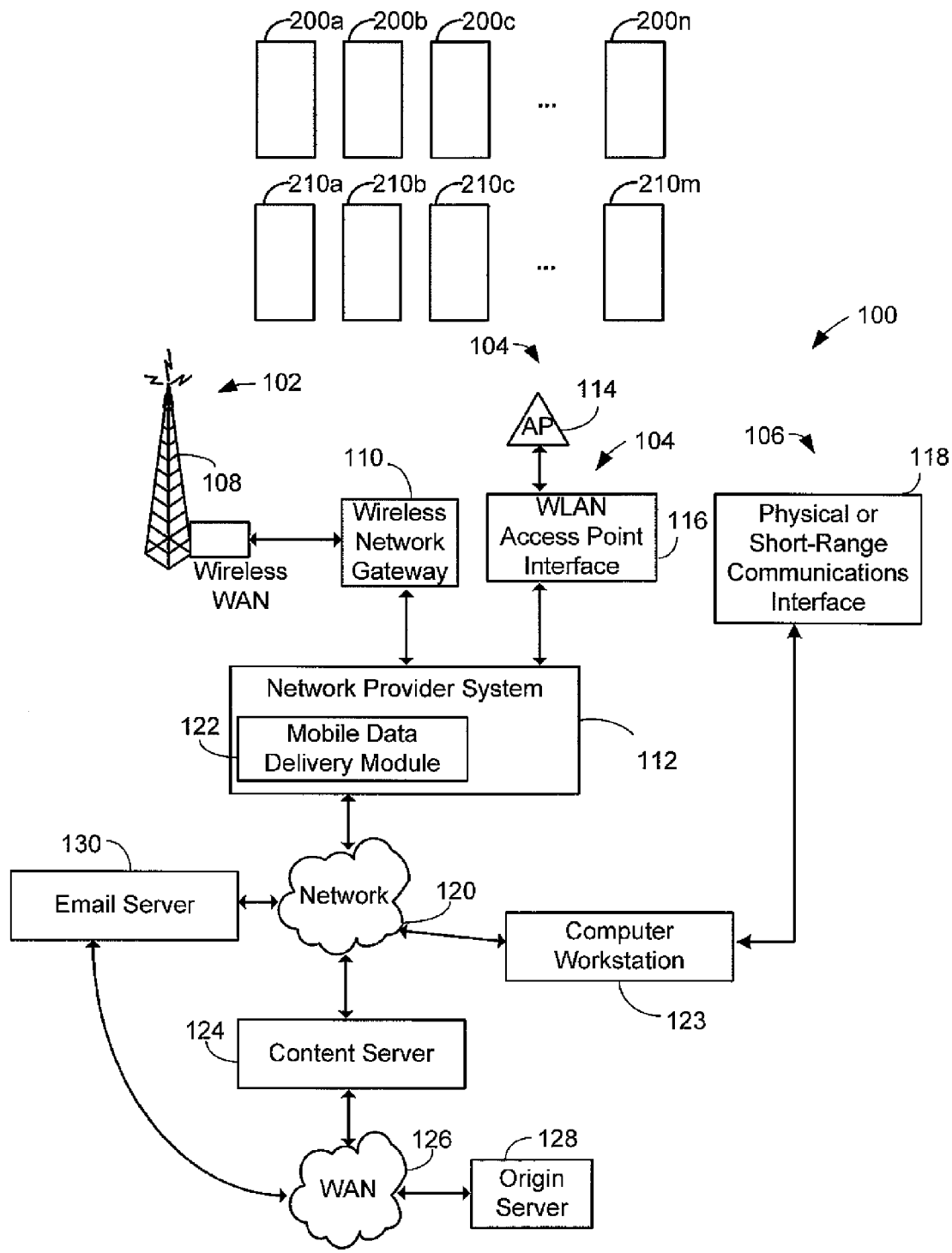
FIG. 1 is a block diagram of a communications system suitable for providing a message delivery mechanism according to an embodiment of the present disclosure.

Reference is first made to FIG. 1, which shows in block diagram form a communication system 100 comprising a data delivery mechanism according to one embodiment. The communication system 100 comprises a wireless Wide Area Network (WAN) 102, a Wireless Local Area Network (WLAN) 104, and/or other communication interfaces or connections 106.

The communications system 100 also includes a wireless network gateway 110 and one or more network provider systems 112. The wireless network gateway 110 provides translation and routing services between the one or more network provider systems 112 and the WAN 102 to facilitate communication with users of the network provider system 112, by way of mobile electronic devices 200 and other types of communication devices (denoted generally by reference 210) connected, directly or indirectly, to the network provider system 112. The mobile communication devices 200 are indicated individually by references 200a, 200b, 200c . . . 200n. The mobile communication devices 200 are utilized by users (e.g., subscribers) to access services from the network provider system 112. An embodiment of the mobile communication device 200 is described in further detail below with reference to FIGS. 2 and 3. The other types of communication devices 210, indicated individually by references 210a . . . 210m, may include, for example, laptop computers with a wireless communication capability or communication-enabled personal digital assistants (PDA's).

In one configuration or implementation, the wireless WAN 102 comprises a packet-based cellular network having a number of base stations 108 (one of which is shown in FIG. 1) with each of the base stations 108 providing wireless Radio Frequency (RF) coverage to a corresponding area or cell. The wireless WAN 102 is typically operated by a cellular network service provider that sells subscription packages to users of the mobile electronic devices 200. The wireless WAN 102 may comprise any one of a number of different types of networks including, by way of non-limiting example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), CDMA2000, IDEN (integrated Digital Enhanced Network), EDGE (Enhanced Data rates for GSM Evolution), or UMTS (Universal Mobile Telecommunications Systems).

The WLAN 104 may be implemented in accordance with IEEE 802.11 standards such as 802.11b and/or 802.11g; however it will be appreciated that other communications protocols may be used for the WLAN 104. The WLAN 104 includes a number of wireless RF Access Points (AP) 114 (one of which is depicted in FIG. 1) that collectively provide a WLAN coverage area. In one embodiment, the WLAN 104 is operated by an enterprise (for example, a business or a university) and the access points 114 are connected to an access point or AP interface 116. The AP interface 116 provides translation and routing services between the access points 114 and the network provider system 112 to facilitate communication between the mobile electronic devices 200 and the other devices 210 connected, directly or indirectly, to the network provider system 112. The AP interface 114 may be implemented by a computer, for example, a server running a suitable software program. In at least some example embodiments, the WLAN 104 is connected to the enterprise network 120 such that communications between the netwrok provider system 112 and the WLAN 104 are effected through the enterprise network 120.

According to one embodiment, the other communication interfaces 106 are implemented using a physical or short-range interface 118. The physical or short-range interface 118 may comprise Ethernet, Universal Serial Bus (USB), Firewire™, an infrared (IR), or short-range radio frequency (RF) communication (e.g. Bluetooth) connection, or combinations of the forgoing implemented to exchange information between the network provider system 112 and the mobile communication device 200. By way of example, in at least some example embodiments, the user associated with a particular mobile communications device 200 will have a computer workstation 123 such as a desktop or laptop computer designated for his or her use that is connected to the enterprise network 120 by a wired connection or through WLAN access point interface 116. The communications interface 118 can include a short-range connection between the user's mobile device 200 and the user's computer workstation 123. Thus, in such an embodiment, the communications link between the mobile device 200 and the network provider system 112 includes a short-range communications link over a communications interface 118 with the user's computer workstation, and a further communications link between the computer workstation 123 and the mobile delivery module 122 through the enterprise network 120.

The network provider system 112 comprises a server that according to one embodiment is located behind a firewall (not shown). The network provider system 112 provides access for the mobile communication devices 200, through either the wireless WAN 102, the WLAN 104, or the communication interface 106 to the devices connected, for example, through an enterprise network 120 (e.g., an intranet), to the network provider system 112. As shown, the network provider system 112 includes a mobile data delivery module 122 which, as will be described in more detail below, provides functionality to prioritize content and information received from devices connected to the network provider system 112 for transmission over either the wireless WAN 102, the WLAN 104, or the communication interface 106 to the mobile communication devices 200. According to one embodiment, the mobile data delivery module 122 of the network provider system 112 selectively prioritizes the content being sent to the mobile electronic devices 200 based on whether the content should be sent over: (i) the wireless WAN 102; (ii) the WLAN 104 or (iii) the communication interface 106, as will be described in more detail below. In one embodiment, the functionality of the mobile data delivery module 122 is implemented in a computer program, or computer code modules or components, which are executed by a processor or processors in the module 122. The particular implementation details of such a computer program or code will be within the understanding of those skilled in the art. In another embodiment, the mobile data delivery module 122 may be implemented on a separate computer or processor from the network provider system 112.

The enterprise network 120 may be connected to the network provider system 112 through the Internet, an intranet or a direct connection, such as the communications interface 118. According to one embodiment, the enterprise network 120 comprises an intranet for a corporation or other type of organization. In at least some embodiments, the network provider system 112 is part of the enterprise network 120, and is located behind a corporate firewall and connected to the wireless network gateway 110 through the Internet. For this embodiment, an application/content server 124 is connected to the enterprise network 120 and also to another network such as a WAN 126. The WAN 126 may connect with other networks. The WAN 126 may include the Internet, a direct connection, a LAN, a wireless communication link, or any combination thereof. Content providers, such as Web servers, may be connected to the WAN 126, for example, an origin server 128 as shown in FIG. 1. For the embodiment shown in FIG. 1, an email server 130 is connected to and can be part of the enterprise network 120. The email server 130 is configured to direct or redirect email messages received over the WAN 126 and internally within the enterprise network 120 to be addressed to the mobile communication devices 200.

The mobile data delivery module 122 provides HTTP connectivity between the wireless WAN 102 and the WLAN 104 and the communication interface 106 and devices and/or networks connected directly or indirectly to the network provider system 112. The network 120, the application/content server 124, the WAN 126 and the origin server 128 comprise collectively, individually or in various combinations a content source for the network provider system 112. It will be appreciated that the embodiment depicted in FIG. 1 comprises but one possible configuration for a communications system according to the present disclosure.

Figure 2:
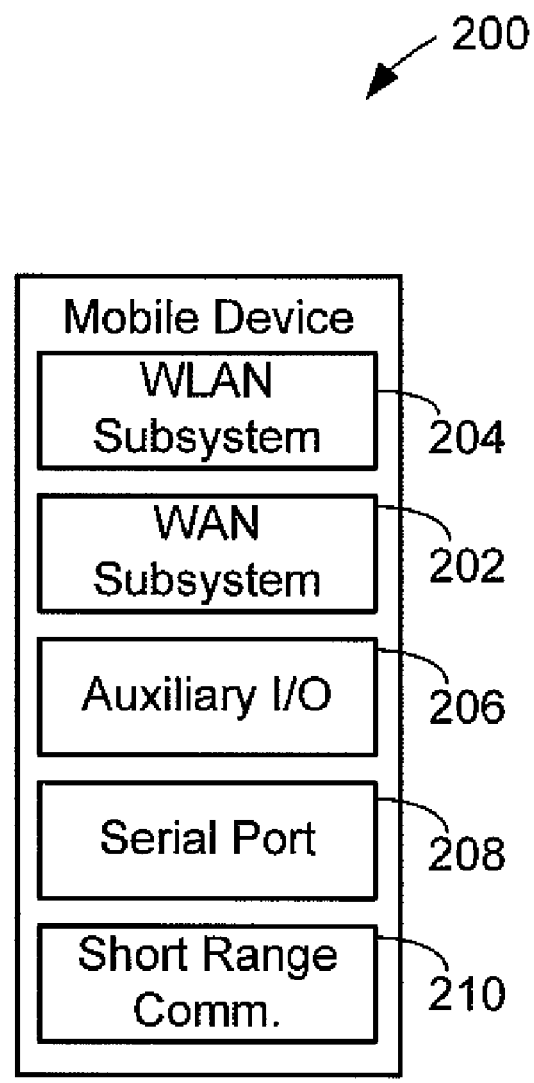
FIG. 2 is a block diagram showing an embodiment of a mobile electronic device for use with the communications system of FIG. 1.

Reference is next made to FIG. 2, which shows an embodiment of the mobile electronic communication device 200. According to this embodiment, the mobile electronic communication device 200 comprises a hand-held, two-way, mobile communication device having at least data capabilities and voice communication capabilities available as options. The mobile electronic device 200 may comprise a data communication device, a multiple-mode communication device configured for both data and voice communication, a mobile telephone, a mobile communication device, a PDA enabled for wireless communications, or a wireless modem operating in conjunction with a computer system or systems.

According to this embodiment, the mobile electronic communication device 200 is configured to operate within the wireless WAN 102 (FIG. 1) and the WLAN 104 (FIG. 1). As shown in FIG. 2, the mobile device 200 includes a WAN communications subsystem 202 for communicating with the wireless WAN 102 and a WLAN communications subsystem 204 for communicating with the WLAN 104 (i.e., via the access points 114 (FIG. 1)). The wireless WAN 102 and the WLAN 104 may have coverage areas that at least partially overlap. For example, the coverage area of the wireless WAN 102 may be much larger than that of the WLAN 104 and may overlap all or a large percentage of the coverage area of the WLAN 104. The WLAN 104 may also have sole coverage in some regions that are dead spots in the wireless WAN 102. For example, some interior locations of an enterprise's buildings may be impenetrable to signals transmitted by the WAN 102. Typically, the channel resources, such as bandwidth available for providing content to the mobile communication devices 200, will be greater over the WLAN 104 than over the wireless WAN 102. The mobile electronic device 200 may also be configured to communicate with the physical interface 118 (FIG. 1). For example, the mobile electronic device 200 may include an auxiliary input/output (I/O) 206, a serial port interface 208, or a short-range communication (e.g., Bluetooth) interface 210. An exemplary implementation for the mobile electronic communication device 200 is described in greater detail below with reference to FIG. 3.

According to this embodiment, the mobile electronic communication device 200 is configured to communicate with the network provider system 112 through alternative communications paths that include the following alternative communications mediums: (i) over the WLAN 104 (FIG. 1) when the device 200 is within the coverage area of the WLAN 104, or (ii) over the short-range interface 118 (FIG. 1) when the device 200 is within physical proximity to the user's workstation such that the mobile electronic device 200 can be connected to the desktop computer by a physical interface or a short-range wireless interface; or (iii) over the wireless WAN 102 (FIG. 1) when the device 200 is inside the coverage area of the wireless WAN 102 and outside the coverage area of the WLAN 104 (FIG. 1) and away from the user's desktop workstation. According to this configuration, the mobile electronic communication device 200 connects through the lower-cost WLAN 104 or short-range interface 118 rather than through the more expensive wireless WAN 102. Content received by the mobile data delivery module 122 (FIG. 1) that is destined for the mobile electronic device 200 is delivered either through the WAN 102 (FIG. 1), the WLAN 104 (FIG. 1) or the communication interface 106 (FIG. 1) according to a number of different criteria that are established by the system administrator and/or the user of the mobile electronic communication device 200, as will be described in more detail below.

Figure 3:
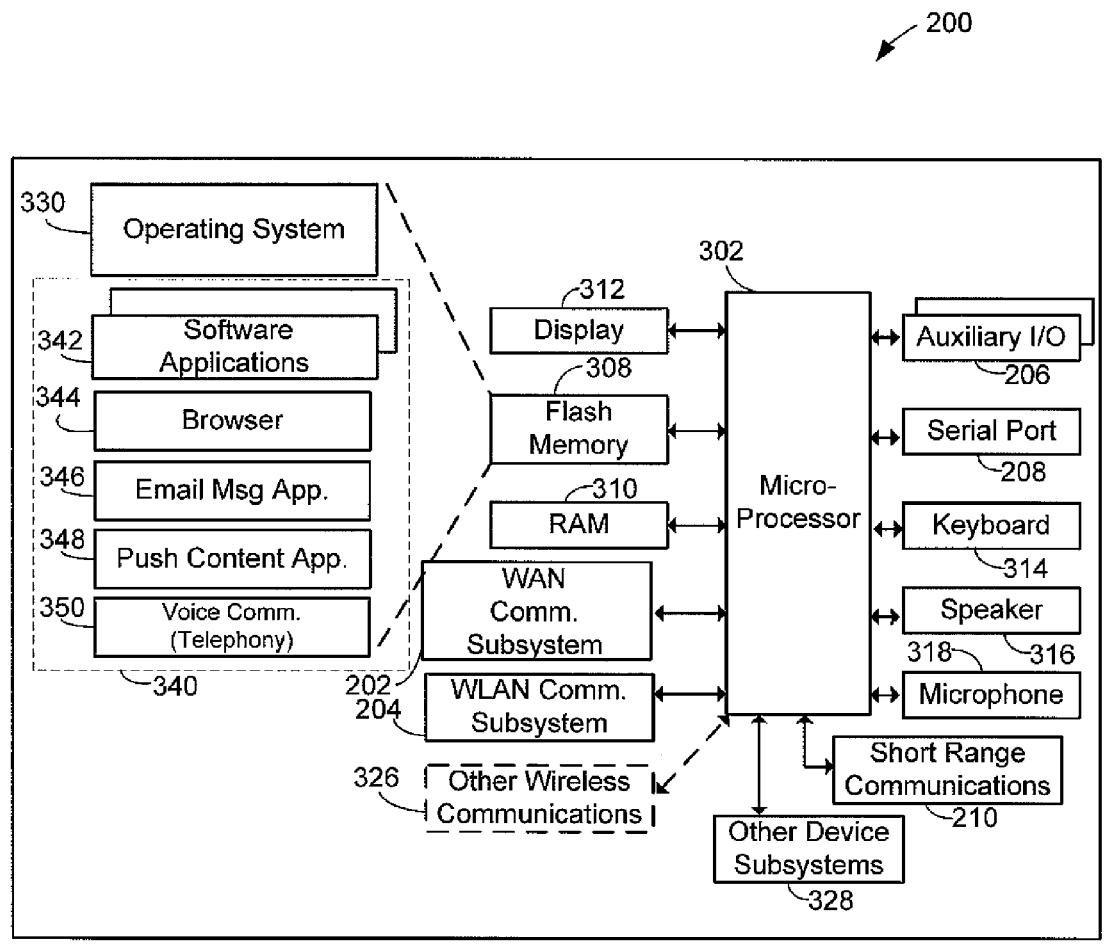
FIG. 3 is a block diagram showing an exemplary implementation for the mobile electronic communication device of FIG. 2.

Reference is next made to FIG. 3, which shows in greater detail an embodiment of the mobile electronic communication device 200. As shown, the mobile electronic communication device 200 includes a microprocessor 302, a wireless WAN communication subsystem 202 for two-way communications with the wireless WAN 102 (FIG. 1), and a WLAN communications subsystem 204 for two-way communications with the WLAN 104 (FIG. 1). The communications subsystems 202 and 204 include respective antennas (not shown), RF transceivers (not shown), in addition to signal processing capabilities, implemented, for example, by a digital signal processor (not shown), as will be understood by those skilled in the art. The microprocessor 302 operates under stored program control and executes a computer program or code modules stored, for example, as firmware in a program memory 308. In known manner, the program memory 308 may comprise a non-volatile memory device, such as flash memory. The mobile communication device 200 also includes a random access memory or RAM 310 and a user interface comprising a display module 312 and a keyboard 314. The RAM 310 is used for storing communication data, data for the display module 312, program or runtime variables, and other types of data or information, as will be apparent to those skilled in the art. The RAM 310 may also be used to store and execute downloaded program modules or code components. The device 200 also includes a speaker 316 and a microphone 318, which, for example, are used for telephony or voice communication functions. As shown, the device 200 includes an auxiliary input/output (I/O) subsystem 206 and a serial port 208. The auxiliary I/O subsystem 206 may comprise an external communications link or interface, for example, an Ethernet connection.

The serial port 208 may be implemented as a USB-type port. The software (i.e., the operating system 330 or the applications 340) may further include a program or code module for synchronizing the mobile electronic device 200 with a desktop computer (not shown) running a compatible synchronization program. The synchronization operation may comprise a number of functions including downloading program or code module updates, synchronizing the user's email on the device 200 with the user's email on the desktop computer, synchronizing a user-defined contacts lists, and providing other types of information exchange. The serial port 208 may also be used as a communication channel for data transfer with the network provider system 112 (FIG. 1), whenever the connection is established.

The computer program(s) or code modules stored in the program memory 310 comprise two general categories of software: operating system software indicated by reference 330 and software applications indicated by reference 340. The software applications 340 may include a range of applications, including, for example, an address book application, a messaging application, a calendar application, and/or a notepad application. As shown, the software applications 340 may also include other software applications 342, a Web browser 344 (i.e., for a Web-enabled mobile electronic communication device 200), an email message application 346, a push content viewing application 348, and/or a voice communication (i.e. telephony) module 350. Each of the software applications 340 may include layout information defining the placement of particular fields and graphic elements (e.g. text fields, input fields, icons, etc.) in the user interface (i.e. the display module 312) according to the application.

Referring still to FIG. 3, the mobile communication device 200 may also include a short-range communication interface 210 and a wireless communication interface 326. The short-range communications interface 210 provides for communication between the mobile electronic device 200 and other types of systems or devices. For example, the short-range communication interface 210 may comprise an infrared communication interface. The wireless communication interface 326 comprises an interface for communicating with other types of wireless networks, for example, a wireless network such as an orthogonal frequency division multiplexed (OFDM) network or a satellite network (not shown).

According to one embodiment, the software for the operating system 330 and a predetermined set of applications that control basic device operations including at least data and voice communication applications, for example, the email message application 346 and the voice communication module 350, are installed on the mobile electronic communication device 200 during the manufacturing or assembly process. Additional applications and/or upgrades to the operating system 330 or software applications 340 may be loaded onto the mobile electronic communication device 200 through the network communication interface (i.e., the wireless WAN 102 (FIG. 1), the WLAN 104 (FIG. 1), or the communication interface 106 (FIG. 1)). Applications or upgrades may also be loaded onto the device 200 using the auxiliary I/O subsystem 206, the serial port 208, the short-range communication subsystem 210 or the other wireless communication interface 326. The downloaded programs or code modules may be permanently installed, for example, written into the program memory (i.e. the flash memory 308), or written into and executed from the RAM 310.

The mobile electronic communication device 200 provides two principal modes of communication: a voice communication mode and a data communication mode. In voice communication mode, the device 200 provides telephony functions and operates as a typical cellular phone. As described above, the telephony functions in the device 200 are provided by a combination of firmware (i.e., the voice communication module 350) and hardware (i.e., the microphone 318, the speaker 316 and the keyboard or keypad 314). In data communication mode, a received signal such as an email message or a Web page download is received and pre-processed by the WLAN communication module 204 or the WAN communication module 202, and then input by the microprocessor 302 for further processing, for example by the email message application 346. The email message application 346 is also used by the user to compose, edit and send email messages, using the keyboard 314 and the display 312.

Figure 4:
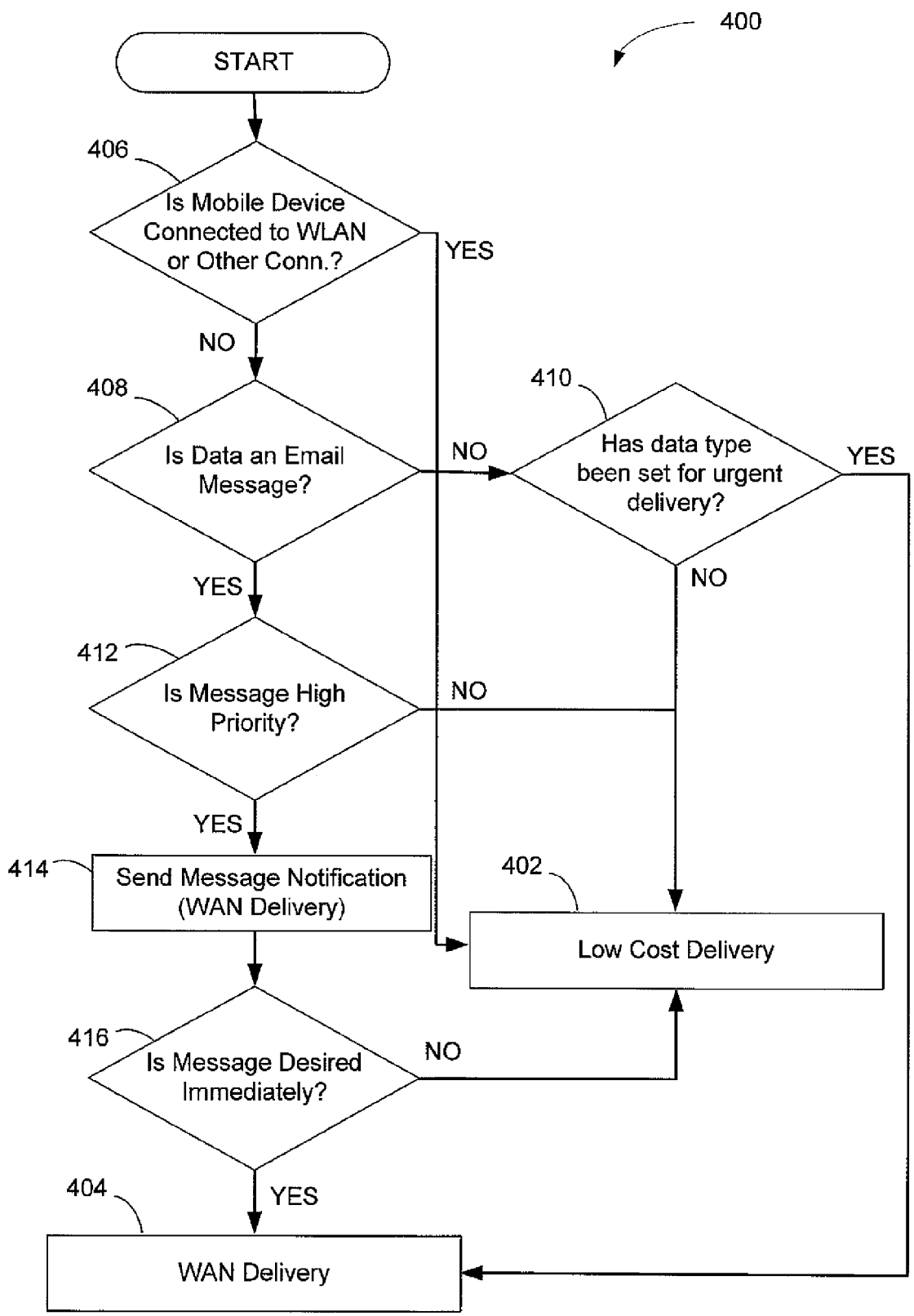
FIG. 4 is a flowchart showing an embodiment of a method for message delivery according to the present disclosure.

Reference is next made to FIG. 4, which shows in flowchart form an embodiment of a method 400 for processing data according to the present invention. According to an embodiment, the method 400 provides a mechanism for determining an appropriate delivery medium or communication channel for data intended for the mobile electronic communication device 200. According to this embodiment, the method 400 or a process embodying the method 400 is implemented in software (e.g., a computer program, computer code modules or code components) executed by the mobile data delivery module 122 (FIG. 1) and/or the network provider system 112 (FIG. 1). The software executed by the mobile data delivery module 122 and/or the network provider system 112 may include settings (e.g., server-side rules, filters, etc.) that are configurable by a network administrator and/or the users of the mobile electronic communication devices 200 (FIG. 1). However, it will be understood that the method 400 may be implemented apart from the network provider system 112 in the communications system 100.

According to the method 400, data intended for the mobile electronic communication device 200 (FIG. 1) is designated using priorities. In the embodiment shown in FIG. 4, data intended for the mobile electronic communication device 200 is designated either as low-priority data or as high-priority data. In some embodiments, certain types or classes of data are assigned or associated with a default priority level prior to the execution of method 400, for example by the user of the device 200, or by an IT administrator. Data designated as low priority is delivered utilizing a low-cost delivery mechanism (i.e., medium or channel), as indicated by block 402 in FIG. 4. Data designated as high priority is delivered utilizing any suitable channel, possibly including a higher-cost delivery mechanism (i.e., medium or channel), as indicated by block 404 in FIG. 4. In another embodiment, the handling of priority designated data may be based on the bandwidth of the available channels. For example, low-priority data may be delivered using high-bandwidth channels and high-priority data may be delivered using any suitable channel, possibly including low-bandwidth channels. It will be understood by those skilled in the art that the prioritization of data for delivery may be used to manage IT resources in any suitable manner, whether the desired measurable is cost, bandwidth, etc. For example, the mobile device 200 may be configured to subscribe to a weather service such that weather data obtained from a origin server 128 is periodically provided to the device 200. The user of the device 200 can identify such data as low priority, so that the weather data will only be delivered to the device over a lower cost communications medium.

As shown in FIG. 4, when data that is addressed to mobile device 200 is received by the network provider system 112 (FIG. 1), then the first step in decision block 406 involves checking to determine if the target mobile electronic device 200 is connected to the WLAN system 104 (FIG. 1) or one of the physical or short-range communication interfaces 106 (FIG. 1), for example, a cradle or USB connection. If the mobile electronic device 200 is connected to either the WLAN system 104 (FIG. 1) or the communication interface 106 (FIG. 1), and if a minimum desired quality of service (QOS) (e.g., signal strength) is present, the data is exchanged through the WLAN system 104 or the communication interface 106 using the low-cost delivery medium or channel as indicated by the block 402. In other words, if lower-cost mediums or "free networks" are available (e.g., the WLAN system 104 or the communication interface 106) and a minimum acceptable QOS can be maintained, normally the preference will be to use the lower-cost mediums, as opposed to costly mediums (e.g., the WAN 102 such as a cellular subscriber service) for all types of data. If the mobile device 200 is not connected to either the WLAN system 104 or the communication interface 106 (as determined in decision step 406) or if a connection is detected but a minimum desired QOS is not present, then a data prioritization method is employed, and the next step in decision block 408 involves checking whether the data to be sent to the mobile electronic device 200 comprises an email message. If the data is not an email message, then a check is made in decision block 410 to determine whether the type of data to be delivered has previously been designated as high-priority data (e.g., weather data, news data, office file update data, scheduling data, or any other type of data falling within a category determined by the user or a system administrator). If the data to be delivered is of the type previously designated as high-priority data (decision block 410), then the data is delivered immediately or on an urgent basis to the mobile electronic device 200 in step 404 using a higher-cost delivery medium (i.e., the WAN 102 (FIG. 1)). If the data to be delivered has not been previously designated as high-priority data (decision block 410), then the data is delivered to the mobile electronic device 200 using the low-cost delivery medium as indicated by step 402. According to this embodiment, the low-cost delivery medium comprises the WLAN 104 (FIG. 1) or the communication interface 106 (FIG. 1), and if a connection is not immediately available through the WLAN 104 or communication interface 106 then the data is queued and the data delivery is subsequently completed when the mobile electronic device 200 is coupled to either the WLAN 104 (FIG. 1) or the communication interface 106 (FIG. 1). Where both a connection through WLAN and a connection through communications interface 106 exist simultaneously between the device 200 and the network provider system 112, the system 112 can be, in an example embodiment, preconfigured to use one of the two connections as the default low-cost choice.

If the data to be delivered is determined to be an email message (decision block 408), then the next step in decision block 412 involves determining if the email message comprises a high-priority message. For example, a high-priority message may be a message from a particular sender, a message concerning subjects designated as high priority, or a message flagged by the sender as high priority. In some embodiments, all email messages are by default considered to be high priority. If the email message is not a high-priority message (decision block 412), then the email message is delivered using the low-cost delivery mechanism in step 402. If the email message is determined to be a high-priority message (decision block 412), then the next operation involves extracting information from the email message for the message notification, then sending the message notification in step 414. The message notification in step 414 is transmitted using the higher-cost mechanism (e.g., the WAN 102 (FIG. 1)), again, assuming low-cost delivery mechanisms are not available, as had been determined at the step 406. According to this embodiment, the message notification includes information extracted from the email messages such as, for example, the sender's name and the subject of the email and may also include a brief summary of the content of the email (for example, the first few lines of the email of to a predetermined number of characters), and/or the names of any files that may be attached to the email. In such an embodiment, the user interface presented on the mobile device 10 for displaying incoming messages could include a preview pane that displays the first few lines of the email contained in the message notification along with the sender name and at least part of the subject line. Alternatively, just the sender name along with part of the subject line could be displayed in the incoming messages interface, and the remaining message notification content could be displayed once the user has selected or opened the message notification from the incoming messages list.

The message notification is intended to provide the user of the mobile communication device 200 with sufficient information to decide if the entire message should be delivered immediately, which in turn will cause the mobile device 200 to send a request back to the network provider system 112 requesting immediate delivery of the entire email message. According to one embodiment, the message notification displayed at the mobile devoce 200 includes a prompt for the user to respond (for example a user selectable "read now" option can be presented to the user). In another embodiment, the prompt is implicit in the message notification for the user to indicate immediate delivery (by selecting or opening the message notification) or delayed delivery of the email message (by ignoring the message notification). As indicated in decision block 416, if a request is received back from the mobile device 200 indicated that the message is desired immediately, then the next operation involves delivering the entire email message using the most suitable delivery mechanism that is currently available, even if that mechanism is the higher-cost delivery mechanism (i.e., as indicated in step 404, the WAN 102). If the user decides that the entire message is not needed immediately (for example, by transmitting a "read later" reply or "low priority" reply in response to a prompt), then the message is flagged as low priority and is delivered at a later time using the low-cost delivery mechanism in the 402. The user may also set all messages as high priority so that message notifications are sent out for all email according to step 414.

Figure 5:
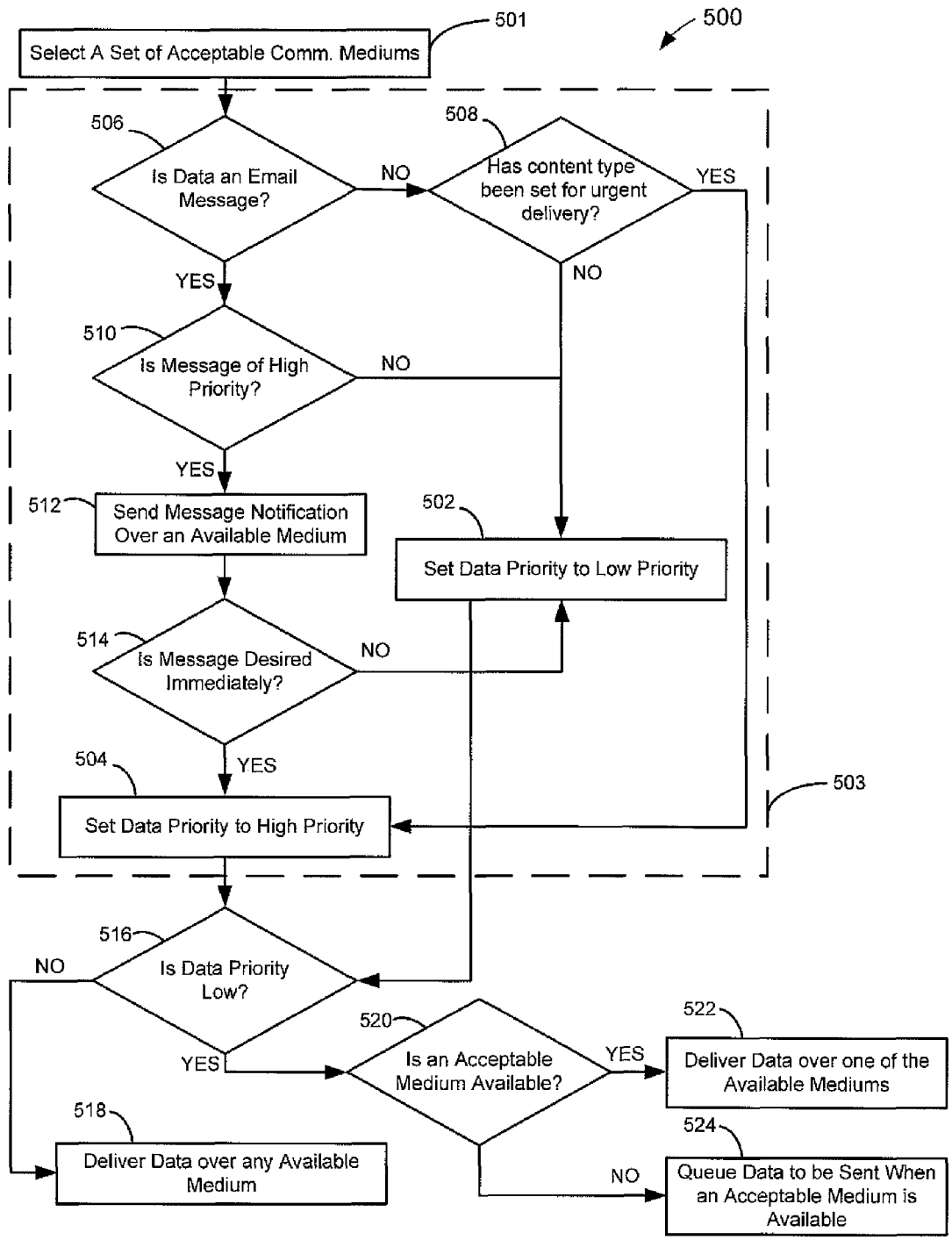
FIG. 5 is a flowchart showing another embodiment of a method for message delivery according to the present disclosure.

Reference is next made to FIG. 5, which shows in flowchart form another embodiment of a method 500 for processing data. According to one embodiment, the method 500 provides a mechanism for determining a delivery priority for a data message and determining an appropriate delivery medium or communication channel based on that priority for data intended for the mobile electronic communication device 200. According to this embodiment, the method 500 or a process embodying the method 500 is implemented in software (e.g., a computer program, computer code modules or code components) executed by the mobile data delivery module 122 (FIG. 1) and/or the network provider system 112 (FIG. 1). The software executed by the mobile data delivery module 122 and/or the network provider system 112 may include settings (e.g., server-side rules, filters, etc.) that are configurable by a network administrator and/or the users of the mobile electronic communication devices 200 (FIG. 1). However, it will be understood that the method 500 may be implemented apart from the network provider system 112 in the communications system 100.

According to the method 500, data intended for the mobile electronic communication device 200 (FIG. 1) is designated using priorities. In the embodiment shown in FIG. 5, data intended for the mobile electronic communication device 200 is designated either as low-priority data (as indicated by block 502) or as high-priority data (as indicated by block 504). Data designated as low priority is delivered utilizing an acceptable medium (i.e., a low-cost delivery mechanism, medium or channel), as indicated by block 522 in FIG. 5. Data designated as high priority is delivered utilizing any medium or channel, possibly including a higher-cost delivery mechanism (i.e., medium or channel), as indicated by block 518 in FIG. 5. In another embodiment, the handling of priority-designated data may be based on the bandwidth of the available channels. For example, low-priority data may be delivered using high-bandwidth channels and high-priority data may be delivered using any suitable channel, possibly including low-bandwidth channels. It will be understood by those skilled in the art that the prioritization of data for delivery, as shown within the dashed block indicated by reference 503 in FIG. 5, may be used to manage IT resources in any suitable manner, whether the desired measurable is cost, bandwidth, etc.

As shown in FIG. 5, a first step 501 of the method 500 involves selecting sets of acceptable communication mediums for use for a particular priority level of data to be sent to the mobile electronic device 200. In one example embodiment, this step is performed in advance by the device user and/or a system administrator, when the user or system administrator determines Which mediums of communication are potentially available for use by the mobile electronic device 200 and what data types of data should be transmitted using what mediums under certain conditions. Thus, step 501 includes setting up a set of rules to be used for selecting a suitable communications channel for transmitting data to the device 10. As shown in FIG. 5, when data is received by the network provider system 112 (FIG. 1), the first step in decision block 506 involves checking whether the data to be sent to the mobile electronic device 200 comprises an email message. If the data is not an email message, then a check is made in decision block 508 to determine whether the type of data to be delivered (i.e., the content type) has previously been designated as high-priority data for urgent delivery (for example, different data types associated with different services can be pre-associated with different urgency levels—weather data and news data may be low urgency, with stock price data, office file update data and scheduling data being high urgency, and other types of data falling within a category determined by the user or a system administrator). If the data to be delivered is of the type previously designated for urgent delivery (decision block 508), then the priority related to the data is set to high priority (step 504). If the data to be delivered has not been previously designated for urgent delivery (decision block 508), then the data priority is set to low priority, indicated by step 502. In some example embodiments, the priority for data corresponds directly to its predetermined urgency level, in which case when a determination is made in step 506 that the data is not an email message, the method can proceed directly from step 506 to step 516 without intervening priority assigning steps 508, 502 or 504, and use the predetermined urgency level for the type of data as the priority level.

Turning again to decision step 506, if the data to be delivered is determined to be an email message, then the next step in decision block 510 involves determining if the email message comprises a high-priority message. By way of example, a high-priority message may be a message from a particular sender, a message concerning subjects designated as high priority, or a message flagged as high-priority by the sender. In some example embodiments, all email messages are considered by default to be high priority messages, or the user may set all messages as high priority so that message notifications are sent out for all email according.

If the email message is not a high-priority message (decision block 510), then the email message priority is set to low priority (step 502). If the email message is determined to be a high-priority message (decision block 510), then the next operation involves extracting data from the email message to create a message notification, then sending a message notification in step 512. The message notification in step 512 is transmitted using any available medium, which may include the higher-cost mediums (e.g., the WAN 102 (FIG. 1)). The message notification is typically sent using the lowest cost available medium at that particular point in time. The message notification can include the same information as described above in respect of method 400 and is intended to provide the user of the mobile communication device 200 with sufficient information to decide if the entire message should be delivered immediately. The message notification can be presented on the mobile device 200 in the same manner as described above in respect of method 200—for example, in one embodiment, the message notification includes a prompt for the user to respond. In another embodiment, the prompt is implicit in the message notification for the user to indicate immediate delivery (by opening the message notification) or delayed delivery (by ignoring the message notification) of the remainder of the email message. If the user indicates a desire to view the entire message immediately, a message is sent back to the network provider system 112 from the communications device 200 indicating that desire and, as per decision block 514, then the next operation involves setting the message priority as high priority in step 504. If the user decides that the entire message is not needed immediately, then the message is flagged as low priority (step 502). In example embodiments the message will be considered low priority until the network provider system receives a request for the message in step 514.

Next, decision block 516 checks the priority that was previously set for the data message in the prioritization process 503. If the priority of the data message is high priority, the data is delivered using any available medium (step 518). In one embodiment, this means that the step 518 delivers the data message to the mobile communication device 200 using any one of the available communications mediums (e.g., through either the WAN 102 (FIG. 1), the WLAN 104 (FIG. 1), or the communication interface 106 (FIG. 1), with the WAN 102 being the least preferable medium). If the priority of the data message is low priority, as determined at the step 516, then it is determined if an acceptable medium of delivery of the data message is available (step 520). In one embodiment, acceptable mediums of delivery for low-priority data messages include the WLAN 104 and the communication interface 106. If an acceptable medium of delivery is available for the low-priority data message as determined by the step 520, then the data message is delivered using one of the available acceptable mediums (step 522). If an acceptable medium of delivery is not available, then the data message is queued to be sent when one of the acceptable mediums is available (step 524).

Embodiments are not limited to a two-tier system of prioritization or a unidirectional implementation. In another embodiment, a series of priorities may be assigned to the various types of data, as well as the various delivery mediums. For example, the WAN 102 may be designated as being primarily for high-priority data, the WLAN 104 for high or medium-priority data, and the communication interface 106 for high, medium, and low-priority data. Different priority designations may be assigned to different types of data or content types, such as email, meeting requests, browser channels, etc., and each priority designation has a preferred method of delivery, as described in relation to the method 400, above. In one embodiment, a ranking of delivery methods is organized as follows: 1. the WAN 102; 2. SMS connections; 3. the WLAN 104; 4. Bluetooth connections; 5. connections with the cradle, etc., with higher numbers being the more cost-effective mediums to use. The methods described above may be designed to include any number of mediums and types of data, according to the design criteria of a particular application.

Additionally, the same prioritization method may be applied to communications originating from the mobile electronic device 200 destined for the communication system 100. Again, different priority designations may be assigned to different types of data, such as email, meeting requests, browser requests, etc., and each priority designation has a preferred method of delivery, as described in relation to the method 400, above. In one embodiment, a ranking of delivery methods is organized as follows: 1. the WAN 102; 2. the WLAN 104; 3. Bluetooth connections; 4. connections with the cradle, etc., with higher numbers being the more cost effective mediums to use. In one embodiment, when low cost mediums are not available to the mobile electronic device 200 (e.g., only the WAN 102 is available), the mobile electronic device 200 employs a method, similar to the method 400 or method 500 described in connection with FIG. 4 or FIG. 5, to decide which outgoing data is immediately sent out over the WAN 102 and which outgoing data is queued to be sent when one of the lower cost mediums is available. In one example, the user of the mobile electronic device 200 may make a decision when an email is composed related to the priority of the email message. If the email message is of high priority, the email message is sent immediately using the lowest cost available method of transmission. If the email message is of low priority and only the high cost medium such as the WAN 102 is available, the message is queued for later transmission.

In operation, the method 400 of FIG. 4 and method 500 of FIG. 5 may be adapted and implemented according to any one of the following exemplary applications or scenarios.

In one scenario, a person sending or receiving an e-mail may have the ability to designate priorities to various message components. For example, if a user A typically receives emails from another user B, the user A or the user B may wish to define a rule to allow only the subject, and other relevant header information to be delivered to the user A over an immediately available medium (i.e., the cheapest delivery method of the WAN 102, the WLAN 104, or the communication interface 106 currently available). Meanwhile, the body of the message is queued for delivery via a lower-priority medium or, if the user A requests the body before a lower priority medium becomes available, the message is delivered through the next-best available medium. Message components that may be designated using different priorities include the subject line, the message body, attachments, graphical content within the messages, etc. Each of these message components may be assigned its own priority. This scenario is also applicable to other data, such as Web page viewing. For example, when the user is browsing the Web, text content may be delivered via the cheapest available medium of the WAN 102, the WLAN 104, and the communication interface 106, but images or graphics are set by default to be delivered via the cheaper medium (e.g., the WLAN 104 or the communication interface 106) unless requested otherwise by the user. As described above, by carefully scrutinizing the various components of the content to be delivered to the mobile electronic device 200 and assigning these various components different priorities, cost savings are available.

In another scenario, a user who is frequently away from his or her desk or office may encounter a situation in which data designated as low-priority data is infrequently sent to the mobile electronic device 200 because the low-cost mediums are rarely available. In this situation, a timer may be implemented. While the timer may be set to any value, typically the user of the mobile electronic device 200 sets the timer to be a fraction of his or her working day (e.g., between 10 minutes and 8 hours). Low-priority data that sits in the queue awaiting a low cost delivery medium for an amount of time that exceeds the timer setting would then be delivered over any available medium so that data does not become stale; this can be done by re-designating the data as being of high priority. Again, this same implementation of using a timer to ensure data does not become stale may be applied to low-priority data originating at the mobile electronic device 200 that was queued for later transmission.

In yet another scenario, the user (i.e., subscriber) for one of the mobile communication devices 200 does not wish to receive push content (e.g., weather updates) on his or her device 200 over the WAN 102 (FIG. 1) because of the cost associated with using the WAN 102 and such content is only to be sent to the mobile electronic device 200 through either the WLAN 104 (FIG. 1) or the communication interface or connection 106 (FIG. 1).

In another scenario, a user wants messages from certain senders, as designated in the user's address book, to be automatically delivered, for example, by either the WAN 102 (FIG. 1), the WLAN 104 (FIG. 1) or the communication interface 106 (FIG. 1). The communication mechanism may be selected by whichever one is available, or the user may establish or set a preference, for example, the WAN 102 (FIG. 1) for immediate availability, or the WLAN 104 (FIG. 1) for lower-cost transmission. Emails from other users are designated as lower-priority messages and are transferred to the mobile electronic communication device 200 (FIG. 1) using the WLAN 104 (FIG. 1) or the communication interface 106 (FIG. 1) when a connection is available or is established, for example, when the user either docks (i.e., connects) the mobile electronic device 200 at a workstation or enters an available WLAN zone (e.g., a "hot spot" in an office). Again, in this scenario the same rules may apply to email messages originating from the mobile electronic device 200.

In yet another scenario, a user exceeds his allocated monthly bandwidth or usage time for the WAN 102 (FIG. 1) and as a result wants to control the amount of data being transferred over the WAN 102 (FIG. 1) to the mobile electronic device 200 in order to reduce or eliminate excess time or data transfer charges, for example, until the next billing cycle begins. Likewise, the user may wish to control the amount of data being transferred over the WAN 102 and originating at the mobile electronic device 200.

In a further scenario or application, a system administrator configures the network provider system 112 (FIG. 1) according to the following two axioms: (a) message notifications are set to the highest priority and are delivered instantly through any medium available (e.g., through either the WAN 102 (FIG. 1), the WLAN 104 (FIG. 1), or the communication interface 106 (FIG. 1)), with the WAN 102 being the least preferable route. The content of a message notification (as described above) is configurable and provides sufficient information for the user to decide if the email is to be read (e.g., whether the email be transferred to the mobile electronic device 200 over the WAN 102 if the WAN 102 is the only medium currently available); (b) if the user decides, after reading the message notification, that the entire message is not to be read (for example, by transmitting a reply to a prompt), the network provider system 112 (FIG. 1) schedules the message for delivery using the lowest-cost path (i.e., the WLAN 104 or the communication interface 106).

According to another embodiment, the user configures the device 200 to handle different types of services with the services having different priorities resulting in the use of different delivery mediums (e.g., communication networks or channels). In one scenario, weather updates are set for one per day and restricted to delivery over the WLAN 104 (FIG. 1) or the communication interface 106 (FIG. 1) when the user is in the office and such connections are available. In another scenario, the user controls the amount of bandwidth used on the WAN 102 (FIG. 1) by setting periodic (e.g., daily or monthly) bandwidth allowances and assigning several different priorities (e.g., very low, low, medium, high, and very high) to different types of data. The network provider system 112 dynamically manages the data and delivers as much data as possible based on the assigned priorities without exceeding the WAN 102 bandwidth that has been allocated to the mobile electronic device 200.

While the embodiments presented have been described in the context of communication networks, it is to be appreciated that the communication techniques and prioritization mechanisms are applicable to other types of communications systems. For example, a communication system where a user or subscriber can obtain (i.e., download) information from a server over two or more communication channels or links, and the communication channels have defined cost or speed differences. A prioritization and/or data delivery mechanism as described above is used to establish a preference or a priority for one of the communication channels or links based on speed of data transfer and/or cost of data transfer.

The described embodiments may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather the foregoing description, and all changes which come within the meaning and range of equivalency of the claims are therefore intended to be embraced therein.

What is claimed is:

1. A method for transmitting data from a first communication device to a second communication device, the second communication device being configured to receive data from the first communication device through a plurality of alternative communications mediums, said method comprising:

determining, on the first communication device, a priority associated with an email message on the first communication device that is to be provided to the second communication device;

selecting, on a first communication device, a desired communications medium for providing the email message to the second communication device, wherein if the priority is a first priority, the desired communications medium is selected from a first set that includes at least one of the plurality of communications mediums, and if the priority is a second priority, the desired communications medium is selected from a second set that includes at least one of the plurality of communications mediums, the first set including at least one communications medium from the plurality of communications mediums that is not included in the second set; and providing the email message from the first communication device to the second communication device over the desired communications medium if the desired communications medium is available, wherein determining a priority associated with the email message comprises:

creating a message notification on the first communication device that comprises information derived from the email message;

sending the message notification from the first communication device to the second communication device over a communication medium selected from the first set; and monitoring on the first communication device for a reply to the message notification from the second communication device and setting the priority to either said first priority or said second priority in dependence upon a result of the monitoring.

2. The method of claim 1 wherein the first priority indicates a higher relative email message priority than the second priority.

3. The method of claim 2 wherein the at least one communications medium that is included in the first set and not included in the second set has a higher relative data transmission cost than any of the communication mediums that are included in the second set.

4. The method of claim 2 wherein when the priority is the first priority, the desired communications medium is selected at least partly in dependence on which, if any, of the communications mediums in the first set are immediately available for providing the email message to the second communication device.

5. The method of claim 2 wherein selecting the desired communications medium comprises determining, when the priority is the second priority and more than one communications medium is included in the second set, which of the communications mediums in the second set are immediately available for providing the email message to the second communication device and (a) if more than one of the communications mediums in the second set are immediately available, selecting as the desired communications medium the available communications medium having the lowest data transmission cost; (b) if only one of the communications mediums in the second set is immediately available, selecting the immediately available communications medium as the desired communications medium; and (c) if none of the communications mediums in the second set is immediately available, then placing the email message in a queue while waiting for at least one of the communications medium in the second set to become available.

6. The method of claim 2 comprising, if the priority is the second priority and no communication medium in the second set is immediately available for transmitting the email message to the second communication device, placing the email message in a queue for future transmission over a communications medium in the second set.

7. The method of claim 6 comprising, after an email message associated with a second priority has been queued for a threshold time period, changing the associated priority from second priority to first priority and removing the email message from the queue.

8. The method of claim 1 wherein at lease one communication medium included in the second set is also included in the first set.

9. The method as claimed in claim 1, wherein said first communication device is a server, and said second communication device is a mobile electronic communication device.

10. The method as claimed in claim 1, wherein said first communication device is a mobile electronic communication device and said second communication device is a server.

11. The method as claimed in claim 1, wherein the at least one communications medium that is included in the first set but not included in the second set comprises a cellular-type wireless communications network.

12. The method of claim 1, wherein the priority is set to the first priority if the result of the monitoring indicates that a user of the second communication device is desirous of receiving the entire email message immediately.

13. The method of claim 1, wherein determining the priority further comprises:

determining on the first communication device, prior to sending the message notification and in dependence on a characteristic of the email message, whether the email message is not urgent and if the email message is determined to be not urgent, then setting the priority to the second priority without sending the message notification or monitoring for a reply to the message notification.

14. The method of claim 13, wherein the characteristic includes a sender identity of the email message.

15. The method of claim 1, wherein the email message includes multiple parts and a separate priority and desired communications medium is determined for at least some of the multiple parts.

16. A first communication device for transmitting data to a second communication device that is configured to receive data from the first communication device through a plurality of alternative communications mediums, said first communication device comprising a memory storing a data delivery module configured for:

determining a priority associated with an email message on the first communication device that is to be provided to the second communication device;

selecting a desired communications medium for providing the email message to the second communication device, wherein if the priority is a first priority the desired communications medium is selected from a first set that includes at least one of the plurality of communications mediums, and if the priority is a second priority the desired communications medium is selected from a second set that includes at least one of the plurality of communications mediums, the first set including at least one communications medium from the plurality of communications mediums that is not included in the second set; and providing the email message to the second communication device over the desired communications medium if the desired communications medium is available, wherein determining a priority associated with the email message comprises:

creating a message notification on the first communication device that comprises information derived from the email message;

sending the message notification from the first communication device to the second communication device over a communication medium selected from the first set; and monitoring on the first communication device for a reply to the message notification from the second communication device and setting the priority to either said first priority or said second priority in dependence upon a result of the monitoring.

17. The first communication device of claim 16, wherein the first priority indicates a higher relative email message priority than the second priority.

18. The first communication device of claim 17 wherein the communications medium that is included in the first set and not included in the second set has a higher relative data transmission cost than any of the communication mediums that are included in the second set.

19. The first communication device of claim 17 wherein the communications medium that is included in the first set and not included in the second set comprises a wireless cellular wide area network, and the second set includes a communications medium that comprises a local area network.

20. The first communication device of claim 17 wherein the data delivery module is configured for, if the priority is the second priority and no communication medium in the second set is immediately available for transmitting the email message to the second communication device, placing the email message in a queue for future transmission over a communications medium in the second set.

21. The first communication device of claim 20 wherein the data delivery module is configured for changing, after an email message associated with a second priority has been queued for a threshold time period, the associated priority from second priority to first priority and removing the email message from the queue.

22. The first communication device of claim 16, wherein the data delivery module is configured to set the priority to the first priority if the result of the monitoring indicates that a user of the second communication device is desirous of receiving the entire email message immediately.

23. The first communication device of claim 22 wherein the data delivery module is configured for:

Determining, prior to sending the message notification and in dependence on a characteristic of the email message, whether the email message is not urgent and if the email message is determined to be not urgent, then setting the priority to the second priority without sending the message notification or monitoring for a reply to the message notification.

24. The first communication device as claimed in claim 16, wherein said second communication device is a mobile electronic communication device and the first communication device is a server for sending data to and receiving data from the mobile electronic communication device.

25. The first communication device as claimed in claim 16, wherein said second communication device is a server and the first communication device is a mobile electronic communication device for sending data to and receiving data from the mobile electronic communication device.

26. The method of claim 1 wherein the message notification comprises a sender name, an email subject, a portion of the content of the email message, or an attachment filename.

27. The first communication device of claim 16 wherein the message notification comprises a sender name, an email subject, a portion of the content of the email message, or an attachment filename.

* * * * *